(12) United States Patent
Kormandel et al.

(10) Patent No.: US 9,600,939 B1
(45) Date of Patent: Mar. 21, 2017

(54) AUGMENTED REALITY PLATFORM USING CAPTURED FOOTAGE FROM MULTIPLE ANGLES

(71) Applicant: Augmently, LLC, Los Angeles, CA (US)

(72) Inventors: Sagi Kormandel, Los Angeles, CA (US); Kelly Chu, Los Angeles, CA (US)

(73) Assignee: Augmently, LLC, Los Angeles, CA (US)

( * ) Notice: Subject to any disclaimer, the term of this patent is extended or adjusted under 35 U.S.C. 154(b) by 0 days.

(21) Appl. No.: 15/159,485

(22) Filed: May 19, 2016

(51) Int. Cl.
*G06T 19/00* (2011.01)
*G06F 3/01* (2006.01)

(52) U.S. Cl.
CPC ............ *G06T 19/006* (2013.01); *G06F 3/011* (2013.01)

(58) Field of Classification Search
None
See application file for complete search history.

(56) References Cited

U.S. PATENT DOCUMENTS

| 2008/0071559 | A1* | 3/2008 | Arrasvuori | G06Q 30/06 705/26.1 |
| 2010/0103075 | A1* | 4/2010 | Kalaboukis | A63F 13/02 345/8 |
| 2013/0259448 | A1* | 10/2013 | Stankiewicz | G06K 9/4628 386/278 |
| 2015/0145889 | A1* | 5/2015 | Hanai | H04N 5/2621 345/633 |
| 2015/0265922 | A1* | 9/2015 | Yamane | A63F 13/525 463/31 |

OTHER PUBLICATIONS

Kotake et al. "A Hybrid and Linear Registration Method Utilizing Inclination Constraint", Proc. of the International Symposium on Mixed and Augmented Realty, ISMAR'05 2005.*

* cited by examiner

*Primary Examiner* — Yingchun He
(74) *Attorney, Agent, or Firm* — Sheppard Mullin Richter & Hampton LLP

(57) ABSTRACT

This disclosure relates to systems and methods for augmenting visual information to simulate an appearance of an object and/or a person at an adjustable position and angle. The visual information may be captured by an image sensor. The object and/or the person may have been captured at multiple angles. A user may select at which particular position and angle the appearance will be superimposed and/or otherwise combined with the visual information.

14 Claims, 7 Drawing Sheets

AUGMENTED REALITY PLATFORM USING CAPTURED FOOTAGE FROM MULTIPLE ANGLES

FIELD

This disclosure relates to systems and methods for augmenting visual information to simulate an appearance of an object and/or a person at an adjustable position and angle.

BACKGROUND

Augmenting visual information may be referred to as augmented reality or AR. Augmenting visual information with superimposed computer-generated graphics is known.

SUMMARY

This disclosure relates to augmenting visual information. The visual information may be captured by an image sensor. The systems and methods described herein simulate an appearance of an object and/or a person. This appearance may be combined with the visual information. The appearance of the object and/or person may be based on captured information of a real object and/or a real person in the real world. The simulated appearance augments the visual information (captured by the image sensor) by adding a virtual version of the object and/or person.

A system configured to augment visual information may include a display component, an image sensor, a motion and/or orientation sensor, one or more processors, electronic storage, and/or other components. In some implementations, the system may include a microphone, a speaker, and/or other components configured to capture and/or reproduce audio information. In some implementations, the image sensor and the one or more processors may be carried on or with the display component, and the field of view of the image sensor may be a function of the position and the orientation of the display component.

The display component may be configured to display images. The display component may be referred to as the display. In some implementations, the display component may include one or more of a head-mounted display, an optical head-mounted display, a see-through display, an optical see-through display, a video see-through display, a visor, eyeglasses, sunglasses, a smartphone, a tablet, a mobile device, a projector, and/or other displays.

The image sensor may be configured to generate image output signals conveying image information corresponding to a field of view of the image sensor. As used herein, the terms "camera" and/or "image sensor" may include any device that captures images, including but not limited to a single lens-based camera, a camera array, a solid-state camera, a mechanical camera, a digital camera, a charge-coupled device sensor, an active pixel sensor, an N-type metal-oxide-semiconductor sensor, a depth sensor, a remote sensor, a lidar, an infrared sensor, a (monochrome) complementary metal-oxide-semiconductor (CMOS) sensor, and/or other sensors. As used herein, the terms "camera" and/or "image sensor" may include devices that capture still images, video information, and/or combinations thereof. An individual image sensor may have a field of view. Image information within the field of view may be captured. In some implementations, image sensor settings may effectuate a change and/or adjustment in the field of view. Movement and/or changes in position or orientation of an image sensor may effectuate a change and/or adjustment in the field of view.

In some implementations, the motion and/or orientation sensor may be carried by the display. The motion and/or orientation sensor may be configured to generate output signals conveying motion and/or orientation information relative to one or both of the image sensor and the motion and/or orientation sensor. In some implementations, the motion and/or orientation sensor is separate and distinct from the image sensor.

In some implementations, the system may include multiple image sensors, multiple motion and/or orientation sensors, and/or other additional sensors. In some implementations, additional sensors may include, by way of non-limiting example, one or more of an altimeter (e.g. a sonic altimeter, a radar altimeter, and/or other types of altimeters), a barometer, a magnetometer, a pressure sensor (e.g. a static pressure sensor, a dynamic pressure sensor, a pitot sensor, etc.), a thermometer, an accelerometer, a gyroscope, an inertial measurement sensor, global positioning system sensors, a tilt sensor, a motion sensor, a vibration sensor, an image sensor, a camera, an ultrasonic sensor, an infrared sensor, a light sensor, a microphone, an air speed sensor, a ground speed sensor, an altitude sensor, medical sensors (including but not limited to blood pressure sensor, pulse oximeter, heart rate sensor, etc.), degree-of-freedom sensors (e.g. 6-DOF and/or 9-DOF sensors), a compass, and/or other sensors. As used herein, the term "motion sensor" may include one or more sensors configured to generate output conveying information related to position, location, motion, movement, acceleration, and/or other motion-based parameters, including derivative parameters.

The electronic storage may comprise electronic storage media that electronically stores information. The stored information may include visual information of an object and/or a person that has been captured by one or more image sensors. In some implementations, the visual information may include captured visual information that has been captured from multiple angles and/or orientations. For example, the visual information may have been captured from at least eight different angles, at least ten different angles, at least twelve different angles, at least sixteen different angles, and/or another suitable number of different angles.

The one or more physical processors may be configured by machine-readable instructions, e.g. to provide information-processing capabilities and/or execute computer program components. Executing the machine-readable instructions may cause the one or more physical processors to perform augmenting visual information. The machine-readable instructions may include one or more of an image sensor component, a user interface component, an information retrieval component, a composite information component, a parameter determination component, a positional adjustment component, a display control component, an orientation component, a modification component, and/or other components.

The image sensor component may be configured to determine information based on image output signals generated by one or more image sensors. The determined information may include image information. As used herein, the term "determine" (and derivatives thereof) may include measure, calculate, compute, estimate, approximate, generate, and/or otherwise derive, and/or any combination thereof.

The user interface component may be configured to facilitate interaction between users and the system. For example, the user interface component may be configured to receive user input from a user. The received user input may indicate a position and/or location within a field of view of an image sensor. By way of non-limiting example, user input may be received through an input device. An input device may include a key entry device, a touch entry device, an imaging device, a sound device, and/or other input devices. In some implementations, user input received from a user may indicate an orientation angle of the object and/or the person, e.g. relative to the field of view of the image sensor.

The information retrieval component may be configured to retrieve and/or obtain information from electronic storage. For example, the information retrieval component may be configured to retrieve visual information from the electronic storage. The retrieved visual information may depict an object and/or a person. As used herein, the term "obtain" (and derivatives thereof) may include active and/or passive retrieval, determination, derivation, transfer, upload, download, submission, and/or exchange of information, and/or any combination thereof.

The composite information component may be configured to generate and/or determine composite visual information. As used herein, the term "re-determine" may refer to generating or determining at least part of the composite visual information for a second time or more. The composite visual information may be based on image information (as conveyed by the generated image output signals) and visual information (as retrieved by the information retrieval component). The composite information component may be configured to operate such that the composite visual information depicts the object and/or person (depicted in the visual information) positioned at a particular position (as indicated by the received user input) in the image depicted by the image information. Alternatively, and/or simultaneously, in some implementations, the composite information component may be configured to operate such that the composite visual information depicts the object and/or person (depicted in the visual information) positioned at a particular orientation angle (as indicated by the received user input) in the image depicted by the image information. Once depicted in the composite visual information, the object and/or person may be considered a virtual object and/or a virtual person, since their appearance is simulated.

The parameter determination component may be configured to determine parameters based on output signals from one or more sensors. For example, the parameter determination component may be configured to determine motion and/or orientation information based on the output signals generated by the motion and/or orientation sensor.

The positional adjustment component may be configured to detect and/or determine a positional adjustment of the system and/or a component thereof, including but not limited to the image sensor. The positional adjustment may be detected and/or determined based on one or more determined parameters, including but not limited to parameters pertaining to motion and/or orientation information as determined by the parameter determination component. For example, subsequent to movement of the image sensor that corresponds to a new field of view, the image sensor may be configured to generate image output signals conveying new image information corresponding to the new field of view of the image sensor.

In some implementations, subsequent to movement of the image sensor, the composite information component may be configured to generate and/or determine composite visual information anew. This operation of the composite information component may be referred to as "re-determining" or "regenerating" composite visual information. Subsequent to movement of the image sensor, the composite information component may be configured to operate such that the new composite visual information depicts the object and/or person (depicted in the visual information) positioned at the same particular position (as indicated by the received user input) in the image depicted by the new image information corresponding to the new field of view.

The display control component may be configured to control the display component and/or effectuate displaying of composite visual information on the display component. As used herein, the term "effectuate" (and derivatives thereof) may include active and/or passive causation of any effect.

The orientation component may be configured to determine and/or select a particular angle from a set of orientations and/or angles at which particular visual information has been captured. For example, in some implementations, particular visual information may have been captured from at least eight angles, ten angles, twelve angles, sixteen angles, and/or another suitable number of capturing angles. In some implementations, the particular angle may be determined and/or selected based on received user input, e.g. the received orientation angle. In some implementations, a particular angle may be determined and/or selected that is the closest to the received orientation angle. The composite information component may be configured to operate such that the composite visual information depicts the object and/or person (depicted in the visual information) positioned at the particular determined and/or selected angle in the image depicted by the image information. In some implementations, the orientation component may be configured to determine a difference (e.g. an angular difference) between the particular angle that is closest to the received orientation angle and the received orientation angle.

The modification component may be configured to modify visual information, e.g. the captured visual information retrieved by the information retrieval component. In some implementations, this modification may be based on the angular difference (and/or other differences) as determined by the orientation component. The composite information component may be configured to operate such that the composite visual information that depicts the object and/or person (depicted in the visual information) is based on the angular difference and/or the modified visual information from the modification component. In some implementations, modified visual information may be based on captured visual information at two angles and/or orientations.

In some implementations, the system may include one or more client computing platforms. Client computing platforms may include one or more processors configured to execute computer program components. The computer program components may be configured to enable a user associated with a client computing platform to interact with the system, any component thereof, other client computing platforms, and/or provide other functionality attributed herein to client computing platforms. By way of non-limiting example, client computing platforms may include one or more of a desktop computer, a laptop computer, a handheld computer, a NetBook, a mobile telephone, a "smart phone", a tablet, a (smart) watch, a mobile computing platform, a gaming console, a television, an electronic device, and/or other computing platforms. Users may communicate using any of the computing platforms described in this disclosure, and/or any combination of computing platforms described in this disclosure.

One aspect of the disclosure relates to methods for augmenting visual information.

As used herein, any association (or relation, or reflection, or indication, or correspondency) involving objects, persons, positions, angles, signals, information, sensors, parameters, adjustments, thresholds, functions, notifications, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
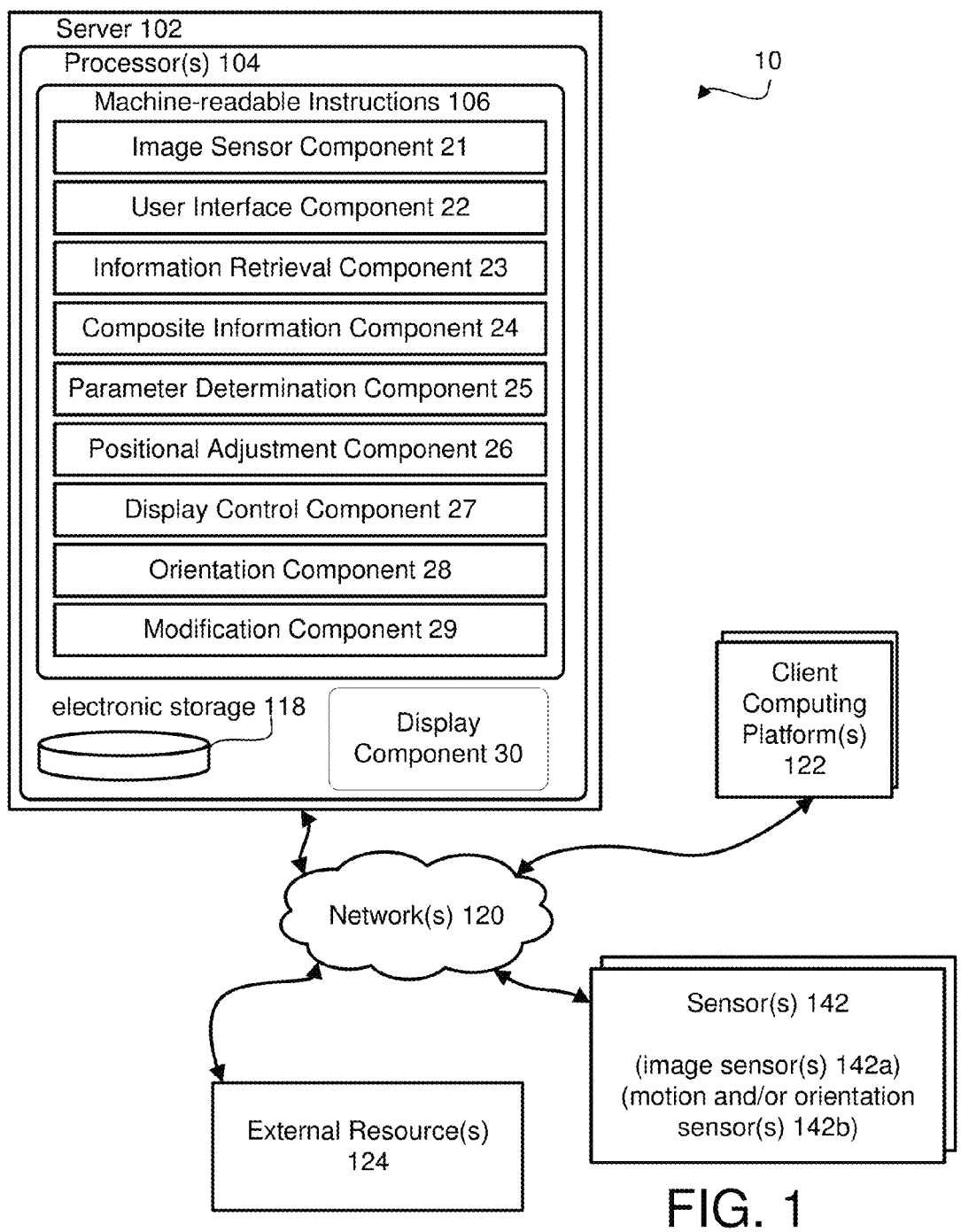
FIG. 1 illustrates a system configured to augment visual information, in accordance with one or more implementations.

FIG. 1 illustrates a system 10 configured to augment visual information. The visual information may be captured by an image sensor. The systems and methods described herein simulate an appearance of an object and/or a person. This appearance may be combined with the visual information. System 10 may include a display component 30, one or more sensors 142 (including but not limited to an image sensor 142a, a motion and/or orientation sensor 142b, and/or other sensors), one or more servers 102, one or more processors 104, machine-readable instructions 106, electronic storage 118, and/or other components. In some implementations, system 10 may include a microphone, a speaker, and/or other components configured to capture and/or reproduce audio information. In some implementations, image sensor 142a and one or more processors 104 may be carried on or with display component 30 (e.g. in the same housing), and the field of view of the image sensor may be a function of the position and the orientation of the display component. In some implementations, system 10 may include one or more client computing platforms 122, one or more networks 120, one or more external resources 124, and/or other components.

Display component 30 may be configured to display images. Display component 30 may be referred to as display 30. Image sensor 142a may be configured to generate image output signals conveying image information corresponding to a field of view of image sensor 142a. An individual image sensor such as image sensor 142a may have a particular field of view. Image information within the field of view may be captured. In some implementations, image sensor settings may effectuate a change and/or adjustment in the field of view. Movement and/or changes in position or orientation of image sensor 142a may effectuate a change and/or adjustment in the field of view.

In some implementations, the motion and/or orientation sensor 142b may be carried by display component 30. Motion and/or orientation sensor 142b may be configured to generate output signals conveying motion and/or orientation information relative to one or both of image sensor 142a, the motion and/or orientation sensor 142b, and/or one or more other components of system 10. In some implementations, motion and/or orientation sensor 142b is separate and distinct from image sensor 142a. In some implementations, system 10 may include multiple image sensors 142a, multiple motion and/or orientation sensors 142b, and/or other additional sensors 142.

Electronic storage 118 may comprise electronic storage media that electronically stores information. The stored information may include visual information of an object and/or a person that has been captured by one or more image sensors 142a. In some implementations, the visual information may include captured visual information that has been captured from multiple angles and/or orientations. For example, the visual information may have been captured from at least eight different angles, at least ten different angles, at least twelve different angles, at least sixteen different angles, and/or another suitable number of different angles.

One or more physical processors 104 may be configured by machine-readable instructions 106, e.g. to provide information-processing capabilities and/or execute computer program components. Executing machine-readable instructions 106 may cause one or more physical processors 104 to perform augmenting visual information. Machine-readable instructions 106 may include one or more of an image sensor component 21, a user interface component 22, an information retrieval component 23, a composite information component 24, a parameter determination component 25, a positional adjustment component 26, a display control component 27, an orientation component 28, a modification component 29, and/or other components.

Figure 3:
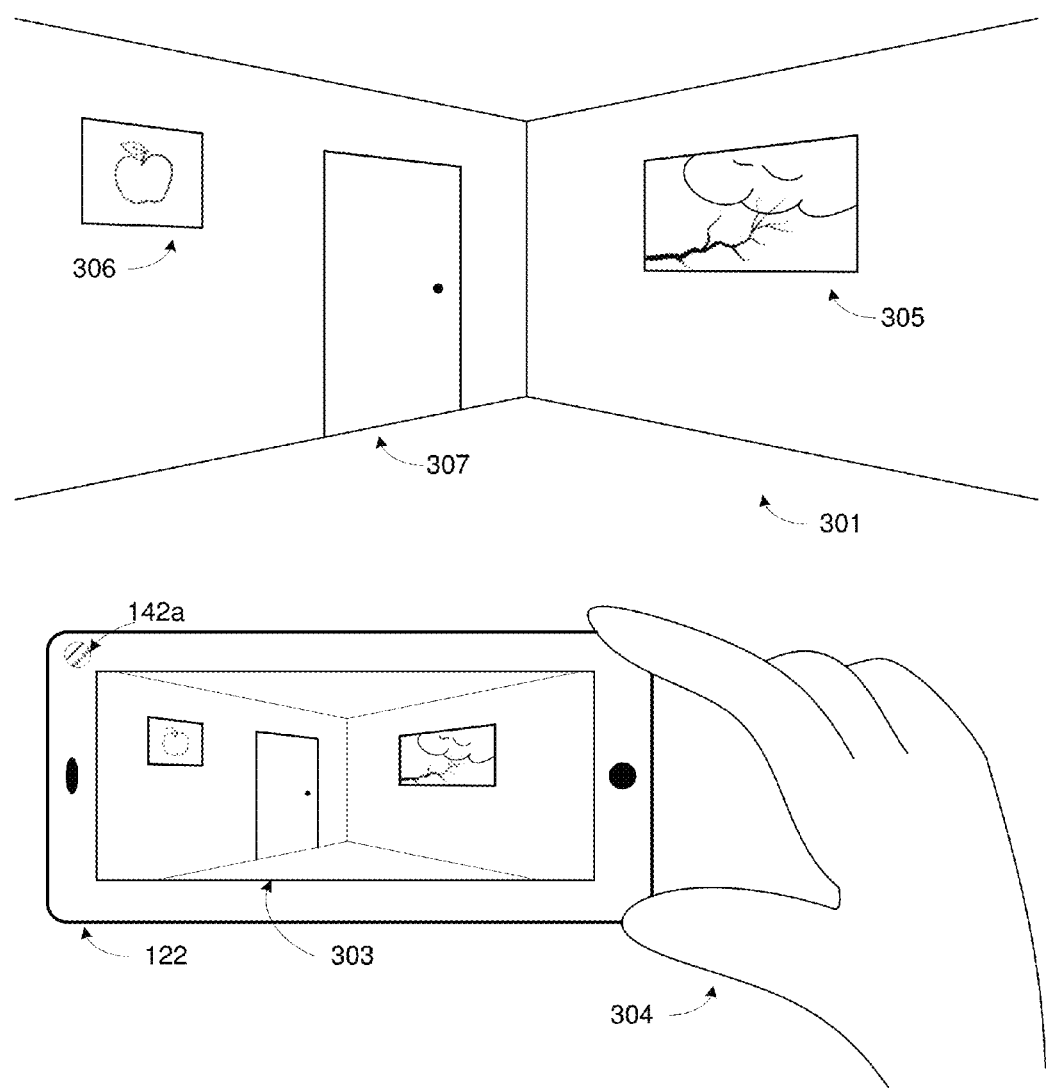
FIG. 3 illustrates an exemplary scenario for using a system to augment visual information.

Image sensor component 21 may be configured to determine information based on image output signals generated by one or more image sensors 142a. The determined information may include image information. By way of illustration and non-limiting example, FIG. 3 illustrates an exemplary scenario for using system 10 to augment visual information. As depicted in FIG. 3, a scene or area 301 in the real world may include various objects, such as a window 305, a picture 306, a door 307, and/or other objects. A user (indicated here by a hand 304 of the user that is holding a client computing platform 122, e.g. a smart phone). Client computing platform 122 may include a display component 30 and an image sensor 142a (depicted in a non-solid pattern to indicate the position is on the backside of client computing platform 122, facing towards the scene or area 301). Display component 30 presents visual information 303 captured by image sensor 142a of scene or area 301 insofar it falls within a field of view of image sensor 142a. In some implementations, presentation of the visual information may be performed at least in part through operations by image sensor component 21 (not depicted in FIG. 3).

In some implementations, image sensor component 21 may be configured to determine depth information, three-dimensional information, and/or information pertaining to the real world as viewed from the image sensor 142a. Image sensor component 21 may be configured to transform the image output signals to two-dimensional information that corresponds to display component 30. In some implementations, such transformations may be accomplished through one or more transformation matrices.

Referring to FIG. 1, user interface component 22 may be configured to facilitate interaction between users and system 10. For example, user interface component 22 may be configured to receive user input from a user. The received user input may indicate a position and/or location within a field of view of image sensor 142a. Such a position and/or location may be referred to herein as the "selected position." By way of illustration and non-limiting example, in the scenario depicted in FIG. 3, a user may provide user input to indicate a selected position by tapping, pointing, and/or clicking at a particular position on display component 30. In some implementations, a selected position includes more information than merely a two-dimensional set of coordinates within captured visual information. In some implementations, a selected position may include three-dimensional coordinates. In some implementations, a selected position may include depth information, including but not limited to a distance from system 10 and/or a component of system 10 (e.g. image sensor 142a).

Referring to FIG. 1, by way of non-limiting example, user input may be received through an input device. In some implementations, user input received from a user may indicate an orientation angle of the object and/or the person, e.g. relative to the field of view of image sensor 142a. For example, in some implementations, particular visual information may have been captured from at least eight angles, ten angles, twelve angles, sixteen angles, and/or another suitable number of capturing angles.

Figure 2:
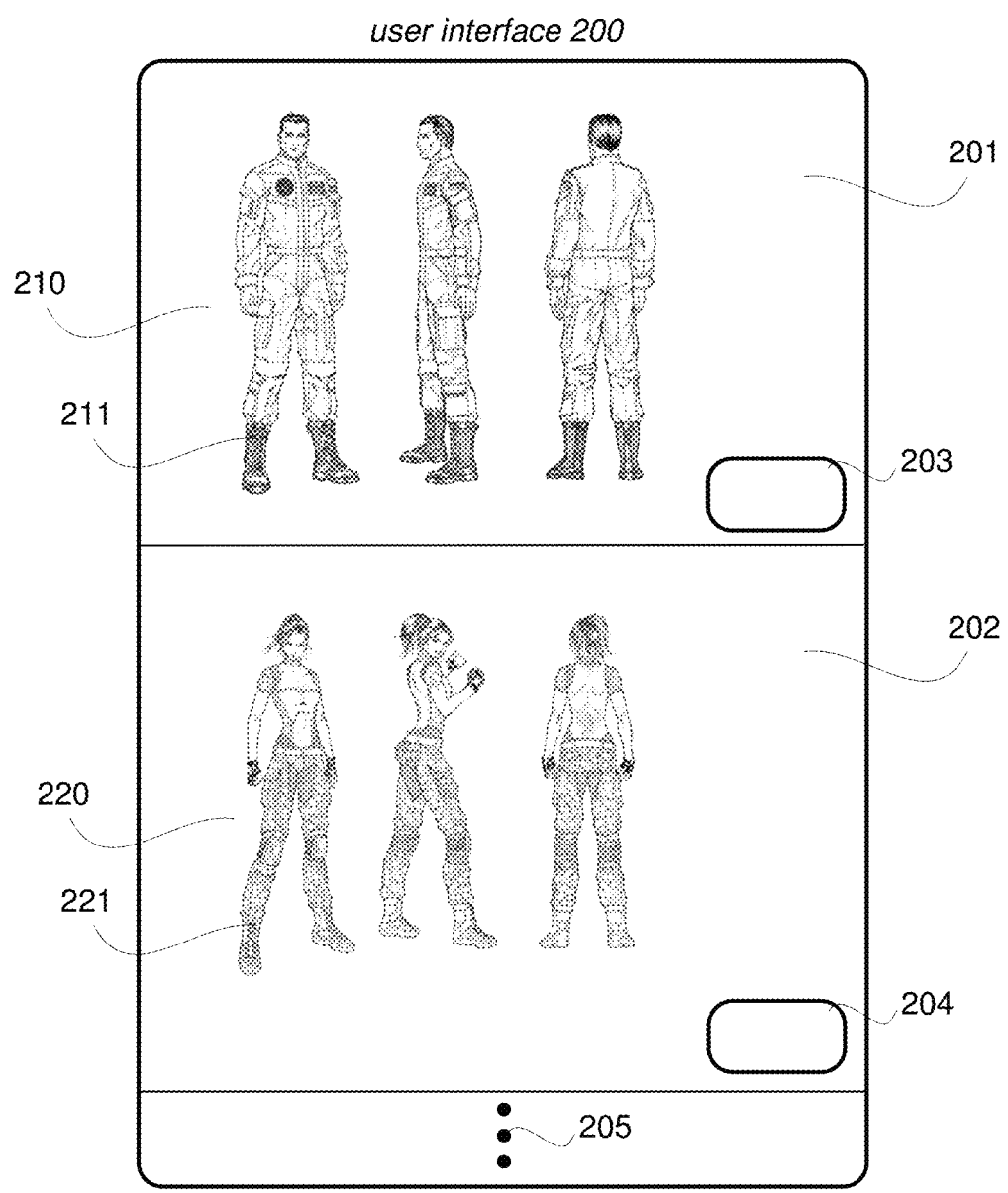
FIG. 2 illustrates an exemplary user interface used in a system to augment visual information.

In some implementations, the received user input may select one or more objects and/or persons to be used to augment visual information. As used here, the term "object and/or person" or derivatives thereof may include still images, moving images, video information, animations, and/or combinations thereof. By way of illustration and non-limiting example, FIG. 2 illustrates an exemplary user interface 200 that may be used to augment visual information. User interface 200 may include user interface elements that allow a user to provide user input that is received by user interface component 22 (shown in FIG. 1). Referring to FIG. 2, the user interface elements may include a section 201 and a section 202, an action element 203 and an action element 204, a scrolling indicator 205, a first set of views 210 including captured visual information from various angles of a first person 211, a second set of views 220 including captured visual information from various angles of a second person 221, and/or other user interface elements. As illustrated in FIG. 2, section 201 may include action element 203 and first set of views 210. As illustrated in FIG. 2, section 202 may include action element 204 and second set of views 220. In some implementations, a set of views may include only one view of captured visual information of a particular object and/or person. In some implementations, a set of views may include two or more views of captured information of a particular object and/or person. For example, as illustrated in FIG. 2, a set of views may include three views from different angles of the same person. A user may select a particular set, object, and/or person through action element 203 and 204. A user may view and/or select additional sets, objects, and/or persons through scrolling indicator 205.

In some implementations, the captured visual information depicted in user interface 200 may be based on visual information captured in the real world of a real person, for example using live capture. In such a case, the captured visual information may not be based on 3D modeling and/or other types of virtual objects or virtual characters. To improve the life-like quality of the augmented visual information, the simulated appearance of an object and/or a person may be based on captured visual information of a real object and/or a real person in the real world. In some implementations, such captured visual information may be post-processed and/or enhanced to support additional features, but the basis of the simulated appearance may not be a virtual object (such as a 3D model) or a virtual character.

Referring to FIG. 1, information retrieval component 23 may be configured to retrieve and/or obtain information from electronic storage 118. For example, information retrieval component 23 may be configured to retrieve visual information from electronic storage 118. The retrieved visual information may depict an object and/or a person. For example, the visual information may have been previously captured by one or more image sensors (which may be different and separated from the one or more image sensors 142a). As used herein, the term "previously captured" refers to capture using image sensors occurring prior to a user engaging via a user interface with system 10. The captured visual information may include still images, moving images, video information, animations, and/or combinations thereof.

Composite information component 24 may be configured to generate, determine, and/or re-determine composite visual information. The composite visual information may be based on image information (e.g., as conveyed by the generated image output signals) and visual information (e.g., as retrieved by information retrieval component 23). In some implementations, the image information may include still images, moving images, video information, and/or combinations thereof. In some implementations, the (previously captured) visual information may include still images, moving images, video information, and/or combinations thereof. Any type of image information may be combined with any type of captured visual information. For example, in a certain use case scenario, both the image information and the captured visual information may include still images. In such a case, the composite visual information may include a still image. For example, in another use case scenario, the image information may include (live and/or recorded) video information and the capture visual information may include a still image. In such a case, the composite visual information may include either a still image or moving images. For example, in another use case scenario, the image information may include a still image and the captured visual information may include moving images. In such a case, the composite visual information may include either a still image or moving images. For example, in another use case scenario, the image information may include (live and/or recorded) video information and the capture visual information may include moving images. In such a case, the composite visual information may include either a still image or, more likely, moving images and/or video information.

Composite information component 24 may be configured to operate such that the composite visual information depicts the object and/or person (depicted in the visual information) positioned at a particular position (e.g., the selected position as indicated by the received user input) in the image depicted by the image information. Alternatively, and/or simultaneously, in some implementations, composite information component 24 may be configured to operate such that the composite visual information depicts the object and/or person (depicted in the visual information) positioned at a particular orientation angle (as indicated by the received user input) in the image depicted by the image information. In the composite visual information, the simulated object and/or person are a virtual object and/or virtual person, whereas the visual information from image sensor 142a is neither virtual nor simulated. In other words, the visual information from image sensor 142a may be augmented by the simulated appearance of a virtual object and/or a virtual person.

Figure 4A:
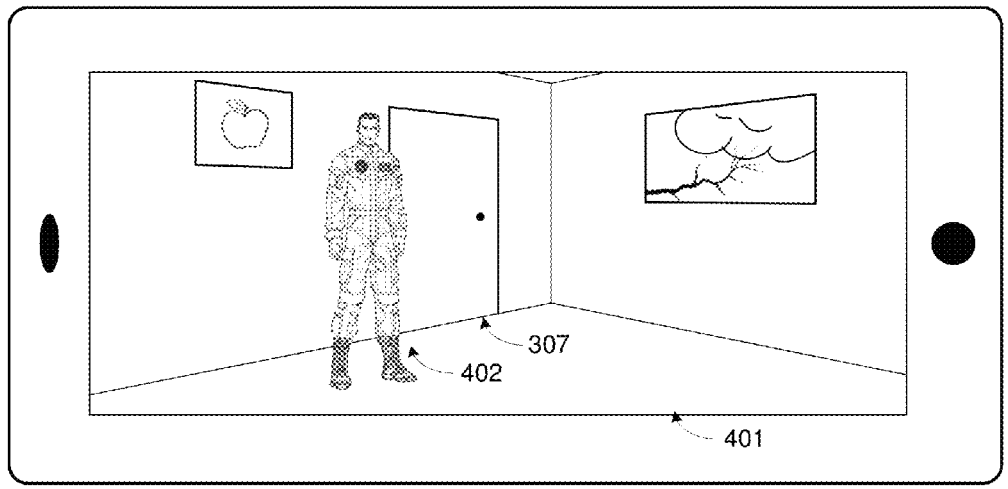
FIGS. 4A-4B illustrate examples of augmenting visual information, in accordance with one or more implementations.
Figure 4B:
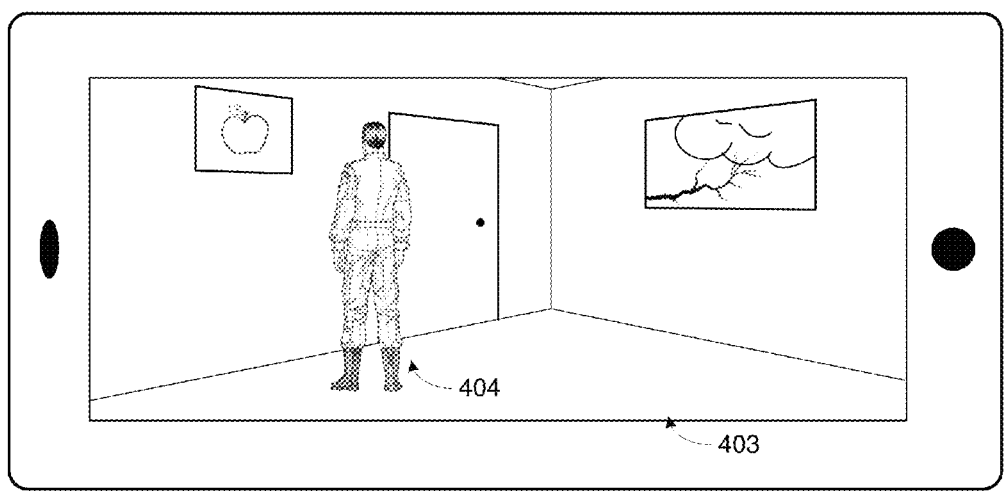

By way of illustration and non-limiting example, FIG. 4A illustrates an example of presenting composite visual information 401 on client computing platform 122. Composite visual information 401 may be determined by augmenting visual information 303 (shown in FIG. 3) with a simulated appearance 402 of first person 211 (shown in FIG. 2 and presumably selected by a user) at a particular position (presumably the selected position that has been selected by a user) in front of door 307. In some implementations, a user may adjust one or more of the position of the simulated appearance 402, an orientation angle of the simulated appearance, and/or other settings that may have a visual effect on composite visual information 401. For example, FIG. 4B illustrates an example of presenting composite visual information 403 on client computing platform 122. Composite visual information 403 may be determined by augmenting visual information 303 (shown in FIG. 3) with a simulated appearance 404 of first person 211 (shown in FIG. 2 and presumably selected by a user) at a particular position (presumably the selected position) in front of door 307, but at a different orientation angle compared to FIG. 4A. In some implementations, a user may adjust an orientation angle of first person 211 interactively while composite visual information is being presented to the user. For example, responsive to user input received from the user, composite visual information 401 may be modified and/or re-determined to be the same as or similar to composite visual information 403.

Figure 5A:
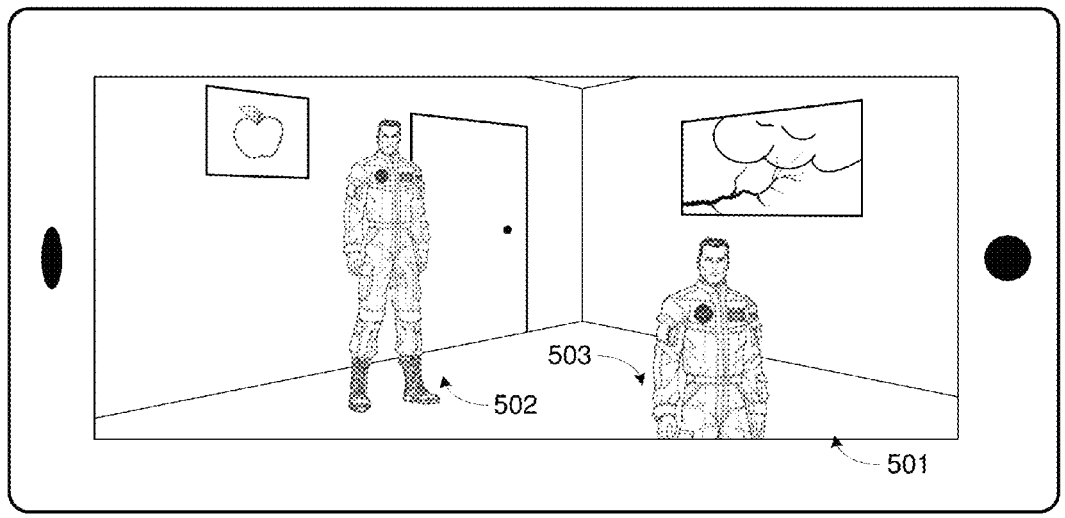
FIGS. 5A-5B illustrate examples of augmenting visual information, in accordance with one or more implementations.
Figure 5B:
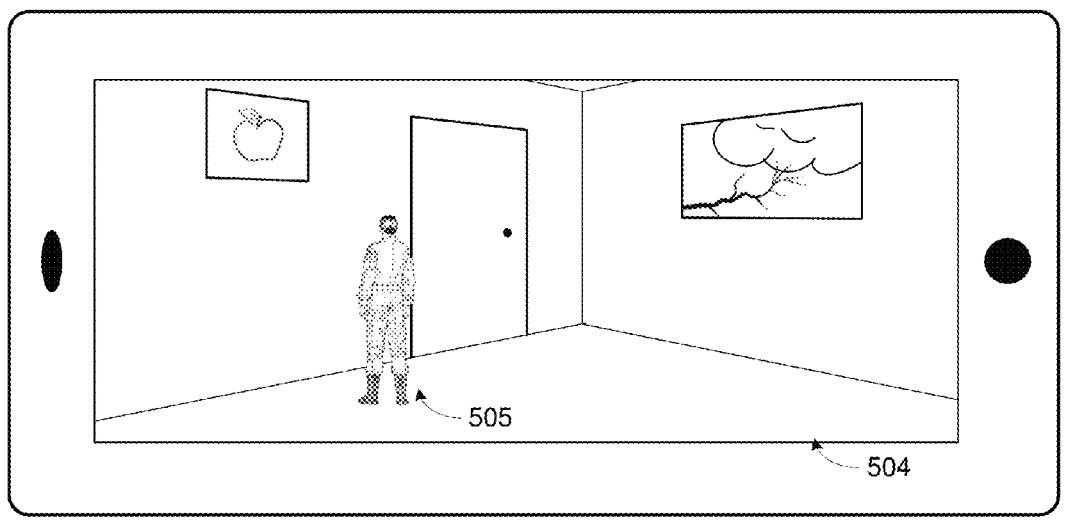

In some implementations, a user may adjust a size of a simulated appearance relative to the scene in the background, and/or other settings that may have a visual effect on composite visual information 401. For example, FIG. 5B illustrates an example of presenting composite visual information 504 on client computing platform 122. Composite visual information 504 may be determined by augmenting visual information 303 (shown in FIG. 3) with a simulated appearance 505 of first person 211 (shown in FIG. 2 and presumably selected by a user) at a particular position (presumably the selected position), but having a different size compared to FIG. 4B.

Referring to FIG. 1, parameter determination component 25 may be configured to determine parameters based on output signals from one or more sensors 142, including but not limited to a compass, a gyroscope, an accelerometer, and/or other additional sensors 142. For example, parameter determination component 25 may be configured to determine motion and/or orientation information based on the output signals generated by motion and/or orientation sensor 142b. In some implementations, parameter determination component 25 may be configured to determine a four-dimensional transformation matrix that can produce image sensor coordinates when concatenated to a vector expressed in real-world coordinates, and/or the inverse of such a matrix.

Positional adjustment component 26 may be configured to detect and/or determine a positional adjustment of system 10 and/or a component thereof, including but not limited to image sensor 142a. Positional adjustment may be detected and/or determined based on one or more determined parameters, including but not limited to parameters pertaining to motion and/or orientation information as determined by parameter determination component 25. For example, subsequent to movement of image sensor 142a that corresponds to a new field of view, image sensor 142a may be configured to generate image output signals conveying new image information corresponding to the new field of view of image sensor 142a. In some implementations, a positional adjustment may be relative to system 10, relative to a particular position within the field of view of image sensor 142a, relative to the selected position, relative to another object, and/or relative to a combination of multiple objects, positions, directions, and/or orientations. For example, positional adjustment component 26 may be configured to determine the positional adjustment of the selected position before and after any movement of system 10.

In some implementations, positional adjustment component 26 may be configured to detect and/or determine a positional adjustment between a first field of view (e.g., before movement) and a second field of view (e.g., after movement) based on detecting one or objects that appear in both the image information corresponding to the first field of view and the secondary image information corresponding to the second field of view. For example, the first and second field of view may overlap to at least some extent.

In some implementations, responsive and/or subsequent to movement of image sensor 142a, composite information component 24 may be configured to generate and/or determine composite visual information anew. This operation of the composite information component may be referred to as "re-determining" or "regenerating" composite visual information. Responsive and/or subsequent to movement of image sensor 142a, composite information component 24 may be configured to operate such that the new composite visual information depicts the object and/or person (depicted in the visual information) positioned at the same particular position (e.g., the selected position as indicated by the received user input) in the image depicted by the new image information corresponding to the new field of view. In some implementations, the composite visual information may correspond to movement of image sensor 142a (e.g., a gradual change in the field of view) while at the same time including a simulated appearance of an object and/or person at the selected position throughout the movement. Maintaining a consistent position of the simulated appearance (i.e. the selected position) may improve the life-like quality of the augmented visual information, in particular responsive to movement of image sensor 142a.

In some implementations, the selected position corresponds to a virtual point of engagement of an object and/or person with a (real-world) surface within the field of view. For example, the surface may be a flat surface such as the floor. The object and/or person will be anchored at this virtual point. Responsive and/or subsequent to movement of image sensor 142a, system 10 may be configured to determine the new position of this virtual point and the new height or size of the object and/or person after the movement. The simulated appearance may be overlaid to create the illusion of a consistent position.

In some implementations, composite information component 24 may be configured to operate such that multiple appearances of objects and/or persons may be simulated simultaneously in the same composite visual information. By way of illustration and non-limiting example, FIG. 5A illustrates an example of presenting composite visual information 501 on client computing platform 122. Composite visual information 501 may be determined by augmenting visual information 303 (shown in FIG. 3) with a first simulated appearance 502 of first person 211 and a second simulated appearance of first person 211 (shown in FIG. 2 and presumably selected by a user) at two distinct positions (presumably both positions have been selected by a user).

Display control component 27 may be configured to control display component 30 and/or effectuate displaying of composite visual information on display component 30.

Orientation component 28 may be configured to determine and/or select a particular angle from a set of orientations and/or angles at which particular visual information has been captured. For example, in some implementations, particular visual information may have been captured from at least eight angles, ten angles, twelve angles, sixteen angles, and/or another suitable number of capturing angles. In some implementations, the particular angle may be determined and/or selected based on received user input, e.g. the received orientation angle. In some implementations, a particular angle may be determined and/or selected that is the closest to the received orientation angle. Composite information component 24 may be configured to operate such that the composite visual information depicts the object and/or person (depicted in the visual information) positioned at the particular determined and/or selected angle in the image depicted by the image information. In some implementations, orientation component 28 may be configured to determine a difference (e.g. an angular difference) between the particular angle that is closest to the received orientation angle and the received orientation angle.

In some implementations, visual information depicting a particular object and/or person may have been captured using a set of image sensors positioned around the particular object and/or person at regular intervals and/or regular distances. For example, a set of eight image sensors may be positioned at or near the vertices of an octagon around the particular object and/or person (i.e., with the particular object and/or person in the center of the octagon). The orientation angles of captured visual information from neighboring image sensors may thus be 45 degrees apart. If a set of image sensors includes more than eight image sensors that are spaced apart evenly and regularly, the orientation angles will be less than 45 degrees apart. In some implementations, the multiple angles of the captured visual information may include different angles that have been captured of the object and/or the person by rotation around a (imaginary) vertical axis. For example, the imaginary vertical axis may go through the center of the octagon.

In some implementations, orientation component 28 may be configured to determine which one or two orientation angles of the captured information are closest to the received orientation angle (e.g., the orientation angle selected by the user). In some implementations, composite information component 24 may be configured to use the captured information from the orientation angle closest to the received orientation angle.

Modification component 29 may be configured to modify visual information, e.g. the captured visual information retrieved by information retrieval component 23. In some implementations, this modification may be based on the angular difference (and/or other differences) as determined by orientation component 28. Composite information component 24 may be configured to operate such that the composite visual information that depicts the object and/or person (depicted in the visual information) is based on the angular difference and/or the modified visual information from modification component 29. In some implementations, modified visual information may be based on captured visual information at two angles and/or orientations. In some implementations, composite information component 24 and/or modification component 29 may be configured to use the captured information from the two orientation angles closest to the received orientation angle.

In some implementations, user interface component 22 may be configured to receive additional user input indicating one or more of a brightness level, a contrast level, a saturation level, a tint level, a blurriness level, and/or another level that may be used to adjust either the entire composite visual information, the captured visual information in the composite visual information, the image information from image sensor 142a, and/or some combination of these types of information. Composite information component 24 may be configured to generate, determine, and/or re-determine composite visual information in accordance with the received additional user input regarding these levels. To improve the life-like quality of the augmented visual information, a user may provide additional user input such that the image information from image sensor 142a and the previously captured visual information may be more visually similar to the user. In some implementations, system 10 may be configured to automatically make adjustments in one or more of a brightness level, a contrast level, a saturation level, a tint level, a blurriness level, and/or another level of either the entire composite visual information, the captured visual information in the composite visual information, the image information from image sensor 142a, and/or some combination of these types of information to improve visual similarity and/or life-like quality of the augmented visual information.

Figure 6:
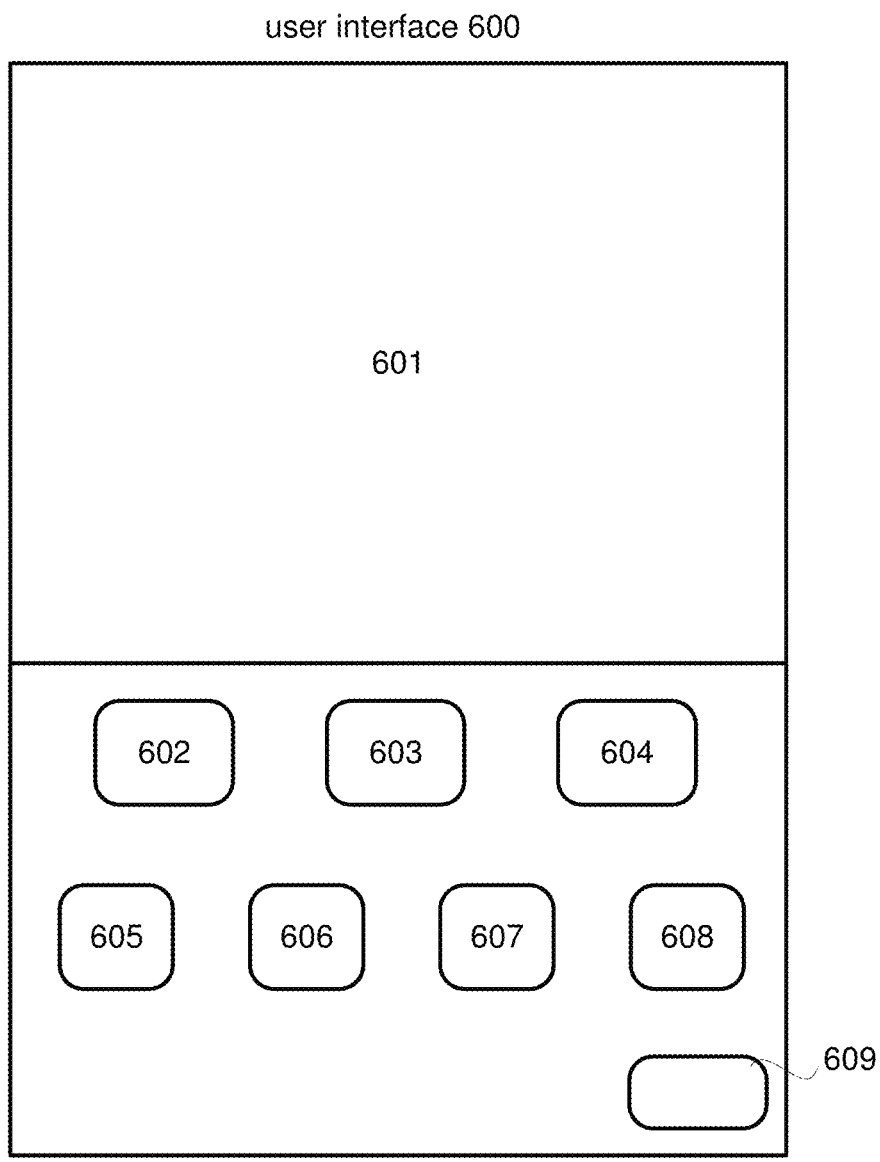
FIG. 6 illustrates an exemplary user interface used in a system to augment visual information.

By way of illustration and non-limiting example, FIG. 6 illustrates an exemplary user interface 600 that may be used to augment visual information in accordance with such additional user input. User interface 600 may include user interface elements that allow a user to provide user input that is received by user interface component 22 and/or other components of system 10 (shown in FIG. 1). Referring to FIG. 6, the user interface elements may include a section 601, an action element 609, scope adjustment elements 602, 603, and 604, level adjustment elements 605, 606, 607, and 608, and/or other user interface elements. Section 601 may include composite visual information, e.g. as determined by composite information component 24 (shown in FIG. 1). Referring to FIG. 6, scope adjustment elements 602, 603, and 604 may allow a user to select on which (visual) information the operations that correspond to level adjustment elements 605-608 are to be applied. For example, scope adjustment element 602 may correspond to the entire composite visual information, scope adjustment element 603 may correspond to only the captured visual information in the composite visual information, and scope adjustment element 604 may correspond to only the image information from image sensor 142a (shown in FIG. 1). Referring to FIG. 6, level adjustment element 605 may correspond to a brightness level, level adjustment element 606 may correspond to a contrast level, level adjustment element 607 may correspond to a saturation level, and level adjustment element 608 may correspond to a blurriness level. A user may confirm the present settings and/or effectuate re-determination of the composite visual information in accordance with user-provided input through elements 602-608 through action element 609.

Referring to FIG. 1, in some implementations, user interface component 22 may be configured to receive additional user input indicating a position where a shadow of an object and/or person is to be positioned. Composite information component 24 may be configured to generate, determine, and/or re-determine composite visual information such that the shadow of the object and/or the person appears to be positioned at the position indicated by the additional user input.

In some implementations, system 10 may include one or more client computing platforms 122. Client computing platforms 122 may include one or more processors 104 configured to execute computer program components. The computer program components may be configured to enable a user associated with client computing platform 122 to interact with system 10, any component thereof, other client computing platforms 122, and/or provide other functionality attributed herein to client computing platforms 122. By way of non-limiting example, client computing platforms 122 may include one or more of a desktop computer, a laptop computer, a handheld computer, a NetBook, a mobile telephone, a "smart phone", a tablet, a (smart) watch, a mobile computing platform, a gaming console, a television, an electronic device, and/or other computing platforms. Users may communicate using any of the computing platforms described in this disclosure, and/or any combination of computing platforms described in this disclosure.

Components of system 10 may communicate with each other through hard-wired communication, wireless communication, or both. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 104 is shown in FIG. 1 as a single entity, this is for illustrative purposes only. In some implementations, processor 104 may comprise a plurality of processing units. These processing units may be physically located within the same device, or processor 104 may represent processing functionality of a plurality of devices operating in coordination.

Processor 104 may be configured to execute one or more computer program components by software; hardware; firmware; some combination of software, hardware, and/or firmware; and/or other mechanisms for configuring processing capabilities on processor 104.

It should be appreciated that although various components of system 10 are illustrated in FIG. 1 as being co-located within a single processing unit, in implementations in which processor 104 comprises multiple processing units, one or more computer program components may be located remotely from the other computer program components.

The description of the functionality provided by the different computer program components 21-29 described herein is for illustrative purposes, and is not intended to be limiting, as any of computer program components 21-29 may provide more or less functionality than is described. For example, one or more of computer program components 21-29 may be eliminated, and some or all of its functionality may be provided by other computer program components 21-29. As another example, processor 104 may be configured to execute one or more additional computer program components that may perform some or all of the functionality attributed to one or more of computer program components 21-29.

The electronic storage media of electronic storage 118 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 118 may be a separate component within system 10, or electronic storage 118 may be provided integrally with one or more other components of system 10 (e.g., processor 104). Although electronic storage 118 is shown in FIG. 1 as a single entity, this is for illustrative purposes only. In some implementations, electronic storage 118 may comprise a plurality of storage units. These storage units may be physically located within the same device, or electronic storage 118 may represent storage functionality of a plurality of devices operating in coordination.

Figure 7:
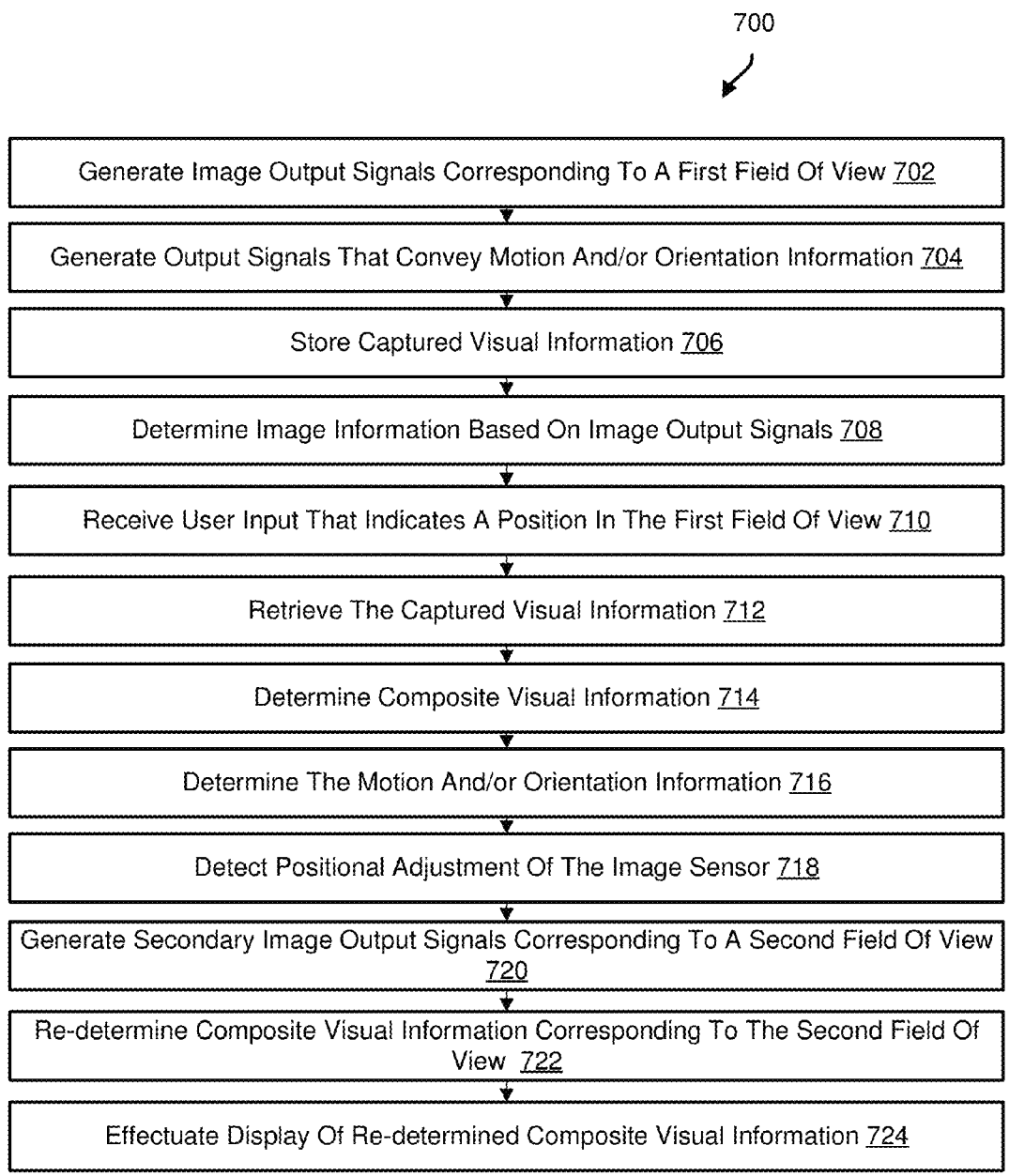
FIG. 7 illustrates a method for augmenting visual information, in accordance with one or more implementations.

FIG. 7 illustrates method 700 for augmenting visual information. The operations of method 700 presented below are intended to be illustrative. In some implementations, method 700 may be accomplished with one or more additional operations not described, and/or without one or more of the operations discussed. In some implementations, two or more of the operations may occur substantially simultaneously.

In some implementations, method 700 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 700 in response to instructions stored electronically on one or more electronic storage mediums. The one or more processing devices may include one or more devices configured through hardware, firmware, and/or software to be specifically designed for execution of one or more of the operations of method 700.

Referring to FIG. 7 and method 700, at operation 702, image output signals are generated that convey image information corresponding to a first field of view of the image sensor. In some embodiments, operation 702 is performed by an image sensor the same as or similar to image sensor 142a (shown in FIG. 1 and described herein).

At an operation 704, output signals are generated that convey motion and/or orientation information relative to the image sensor. The first sensor is separate and distinct from the image sensor. In some embodiments, operation 704 is performed by a motion and/or orientation sensor the same as or similar to motion and/or orientation sensor 142*b* (shown in FIG. 1 and described herein).

At an operation 706, information is stored electronically in electronic storage. The stored information includes captured visual information of an object and/or a person that has been captured at multiple angles. In some embodiments, operation 706 is performed by electronic storage the same as or similar to electronic storage 118 (shown in FIG. 1 and described herein).

At an operation 708, the image information is determined based on the image output signals generated by the image sensor. In some embodiments, operation 708 is performed by an image sensor component the same as or similar to image sensor component 21 (shown in FIG. 1 and described herein).

At an operation 710, user input is received that indicates a position within the first field of view. In some embodiments, operation 710 is performed by a user interface component the same as or similar to user interface component 22 (shown in FIG. 1 and described herein).

At an operation 712, the captured visual information of the object and/or the person is retrieved. In some embodiments, operation 712 is performed by an information retrieval component the same as or similar to information retrieval component 23 (shown in FIG. 1 and described herein).

At an operation 714, composite visual information is determined based on the image information and the captured visual information such that the object and/or the person appear to be positioned at the position indicated by the received user input. In some embodiments, operation 714 is performed by a composite information component the same as or similar to composite information component 24 (shown in FIG. 1 and described herein).

At an operation 716, the motion and/or orientation information is determined based on the output signals generated by the first sensor. In some embodiments, operation 716 is performed by a parameter determination component the same as or similar to parameter determination component 25 (shown in FIG. 1 and described herein).

At an operation 718, a positional adjustment of the image sensor is detected based on the determined motion and/or orientation information. In some embodiments, operation 718 is performed by a positional adjustment component the same as or similar to positional adjustment component 26 (shown in FIG. 1 and described herein).

At an operation 720, subsequent to the positional adjustment, secondary image output signals are generated that convey secondary image information corresponding to a second field of view of the image sensor. The second field of view is different than the first field of view. In some embodiments, operation 720 is performed by an image sensor the same as or similar to image sensor 142*a* (shown in FIG. 1 and described herein).

At an operation 722, responsive to detection of the positional adjustment, the composite visual information is re-determined such that the secondary image information corresponds to the second field of view and further such that the object and/or the person continues to appear to be positioned at the position indicated by the received user input. In some embodiments, operation 722 is performed by a composite information component the same as or similar to composite information component 24 (shown in FIG. 1 and described herein).

At an operation 724, displaying of the re-determined composite visual information is effectuated on a display component. In some embodiments, operation 724 is performed by a display control component the same as or similar to display control component 27 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for augmenting visual information to simulate an appearance of an object and/or a person at an adjustable position and angle, the system comprising:
   a display component configured to display images;
   an image sensor configured to generate image output signals conveying image information corresponding to a first field of view of the image sensor;
   a first sensor, wherein the first sensor is configured to generate output signals conveying motion and/or orientation information relative to the image sensor, wherein the first sensor is separate and distinct from the image sensor;
   electronic storage configured to store information electronically, wherein the stored information includes captured visual information of an object and/or a person that has been captured from at least eight angles; and
   one or more physical processors configured by machine-readable instructions to:
      determine the image information based on the image output signals generated by the image sensor;
      receive user input indicating a position within the first field of view and further indicating an orientation angle of the object and/or the person relative to the first field of view of the image sensor;
      determine a particular angle from the at least eight angles that is closest to the orientation angle;
      retrieve, from the electronic storage, the captured visual information of the object and/or the person, wherein the retrieved captured visual information includes captured visual information that has been captured at the particular angle that corresponds to the orientation angle;
      determine an angular difference between the particular angle and the orientation angle;
      determine composite visual information based on the image information and the captured visual information such that the object and/or the person appear to be positioned at the position indicated by the received user input;
      determine the motion and/or orientation information based on the output signals generated by the first sensor;
      modify the captured visual information associated with the particular angle, wherein the modification is based on the determined angular difference;
      detect a positional adjustment of the image sensor based on the determined motion and/or orientation information, wherein the image sensor, subsequent to the positional adjustment, is configured to generate secondary image output signals conveying secondary image information corresponding to a second field of view of the image sensor, wherein the second field of view is different than the first field of view;

responsive to detection of the positional adjustment, re-determine the composite visual information such that the secondary image information, based on the secondary image output signals, corresponds to the second field of view and further such that the object and/or the person continues to appear to be positioned at the position indicated by the received user input, wherein re-determination of the composite visual information is based on the modified captured visual information; and effectuate displaying of the re-determined composite visual information on the display component.

2. The system of claim 1, wherein the multiple angles include different angles that have been captured of the object and/or the person by rotation around a vertical axis.

3. The system of claim 1, wherein the orientation angle falls between two of the at least eight angles, wherein the one or more physical processors are configured by machine-readable instructions to:

modify the captured visual information associated with the two of the at least eight angles, wherein re-determination of the composite visual information is based on the modified captured visual information such that the object and/or the person appear to be positioned at the orientation angle indicated by the received user input.

4. The system of claim 1, wherein the received user input further indicates a size of the object and/or the person relative to the first field of view of the image sensor, and wherein the one or more processors are configured to re-determine the composite visual information such that the object and/or the person appear to have the size indicated by the received user input.

5. The system of claim 1, wherein the one or more physical processors are further configured by machine-readable instructions to:

receive additional user input indicating one or more of a brightness level of the captured visual information in the composite visual information, a contrast level of the captured visual information in the composite visual information, a saturation level of the captured visual information in the composite visual information, a tint level of the captured visual information in the composite visual information, and a blurriness level of the captured visual information in the composite visual information, wherein the composite visual information is determined in accordance with the additional user input.

6. The system of claim 1, wherein the first field of view and the second field of view overlap in part, wherein detection of the positional adjustment of the image sensor is further based on detecting one or objects that appear in both the image information corresponding to the first field of view and the secondary image information corresponding to the second field of view.

7. The system of claim 1, wherein the one or more physical processors are further configured by machine-readable instructions to:

receive additional user input indicating a second position within either the first field of view or the second field of view where a shadow of the object and/or the person is to be positioned, wherein the composite visual information is re-determined such that the shadow of the object and/or the person appears to be positioned at the second position indicated by the additional user input.

8. A method for augmenting visual information to simulate an appearance of an object and/or a person at an adjustable position and angle, the method comprising:

generating, by an image sensor, image output signals conveying image information corresponding to a first field of view of the image sensor;

generating, by a first sensor, output signals conveying motion and/or orientation information relative to the image sensor, wherein the first sensor is separate and distinct from the image sensor;

storing information electronically in electronic storage, wherein the stored information includes captured visual information of an object and/or a person that has been captured from at least eight angles;

determining the image information based on the image output signals generated by the image sensor;

receiving user input indicating a position within the first field of view and further indicating an orientation angle of the object and/or the person relative to the first field of view of the image sensor;

determining a particular angle from at least eight angles that is closest to the orientation angle;

retrieving, from the electronic storage, the captured visual information of the object and/or the person, wherein the retrieved captured visual information includes captured visual information that has been captured at the particular angle that corresponds to the orientation angle;

determining an angular difference between the particular angle and the orientation angle;

determining composite visual information based on the image information and the captured visual information such that the object and/or the person appear to be positioned at the position indicated by the received user input;

determining the motion and/or orientation information based on the output signals generated by the first sensor;

modifying the captured visual information associated with the particular angle, wherein the modification is based on the determined angular difference;

detecting a positional adjustment of the image sensor based on the determined motion and/or orientation information;

generating, by the image sensor, subsequent to the positional adjustment, secondary image output signals conveying secondary image information corresponding to a second field of view of the image sensor, wherein the second field of view is different than the first field of view;

responsive to detection of the positional adjustment, re-determining the composite visual information such that the secondary image information corresponds to the second field of view and further such that the object and/or the person continues to appear to be positioned at the position indicated by the received user input, wherein re-determination of the composite visual information is based on the modified captured visual information; and effectuating displaying of the re-determined composite visual information on a display component.

9. The method of claim 8, wherein the multiple angles include different angles that have been captured of the object and/or the person by rotation around a vertical axis.

10. The method of claim 8, wherein the orientation angle falls between two of the at least eight angles, the method further comprising:
- modify the captured visual information associated with the two of the at least eight angles,
- wherein re-determination of the composite visual information is based on the modified captured visual information such that the object and/or the person appear to be positioned at the orientation angle indicated by the received user input.

11. The method of claim 8, wherein the received user input further indicates a size of the object and/or the person relative to the first field of view of the image sensor, the method further comprising:
- re-determining the composite visual information such that the object and/or the person appear to have the size indicated by the received user input.

12. The method of claim 8, further comprising:
- receiving additional user input indicating one or more of a brightness level of the captured visual information in the composite visual information, a contrast level of the captured visual information in the composite visual information, a saturation level of the captured visual information in the composite visual information, a tint level of the captured visual information in the composite visual information, and a blurriness level of the captured visual information in the composite visual information; and
- re-determining the composite visual information in accordance with the additional user input.

13. The method of claim 8, wherein the first field of view and the second field of view overlap in part, wherein detecting the positional adjustment of the image sensor is further based on detecting one or objects that appear in both the image information corresponding to the first field of view and the secondary image information corresponding to the second field of view.

14. The method of claim 8, further comprising:
- receiving additional user input indicating a second position within either the first field of view or the second field of view where a shadow of the object and/or the person is to be positioned,
- wherein the composite visual information is re-determined such that the shadow of the object and/or the person appears to be positioned at the second position indicated by the additional user input.

\* \* \* \* \*